US009973829B2

(12) United States Patent
Li et al.

(10) Patent No.: US 9,973,829 B2
(45) Date of Patent: May 15, 2018

(54) METHOD FOR VIDEO COMMUNICATIONS AND TERMINAL, SERVER AND SYSTEM FOR VIDEO COMMUNICATIONS (71) Applicant: Tencent Technology (Shenzhen) Company Limited, Guangdong (CN)

(72) Inventors: Zhongnan Li, Guangdong (CN); Hao Nian, Guangdong (CN)

(73) Assignee: Tencent Technology (Shezhen) Company Limited, Guangdong (CN)

( * ) Notice: Subject to any disclaimer, the term of this patent is extended or adjusted under 35 U.S.C. 154(b) by 301 days.

(21) Appl. No.: 14/554,147

(22) Filed: Nov. 26, 2014

(65) Prior Publication Data
US 2015/0082204 A1    Mar. 19, 2015

Related U.S. Application Data (63) Continuation of application No. PCT/CN2013/076802, filed on Jun. 5, 2013.

(30) Foreign Application Priority Data

Jun. 6, 2012 (CN) .......................... 2012 1 0183638

(51) Int. Cl.
*G06F 3/048* (2013.01)
*G06F 3/00* (2006.01)
(Continued)

(52) U.S. Cl.
CPC ....... *H04N 21/6547* (2013.01); *G06F 3/0481* (2013.01); *H04L 12/1822* (2013.01);
(Continued)

(58) Field of Classification Search
CPC ........... G06F 3/048; G06F 3/00; H04N 12/00; H04N 21/00; H04L 65/40
See application file for complete search history.

(56) References Cited

U.S. PATENT DOCUMENTS

| 8,749,610 B1 * | 6/2014 | Gossweiler | .............. H04N 7/15 348/14.08 |
| 2004/0165768 A1 | 8/2004 | Goto | |

(Continued)

FOREIGN PATENT DOCUMENTS

| CN | 1186278 A | 7/1998 |
| CN | 1292627 A | 4/2001 |

(Continued)

OTHER PUBLICATIONS

Cisco, WebEx Meeting Center User Guide, Jul. 28, 2009, pp. 1-414.*

(Continued)

*Primary Examiner* — Hugo Molina
(74) *Attorney, Agent, or Firm* — Haug Partners LLP; William S. Frommer (57) ABSTRACT A method and system for video communications between a terminal and a server. A first terminal establishes a communication connection with a server through a communication protocol. Local video data displayed in a video zone of the first terminal and other data displayed in a preset whiteboard zone of the first terminal are sent-to the server, to allow the server to send the local video data and the other data to one or more second terminals to be displayed. Complex content can be shown in one-to-one, one-to-many or many-to-many video communications applications to satisfy the demand and experience of video communications in the scenes of chats.

3 Claims, 8 Drawing Sheets (51) Int. Cl.
*H04N 21/00* (2011.01)
*H04N 21/6547* (2011.01)
*H04L 12/18* (2006.01)
*G06F 3/0481* (2013.01)
*H04N 21/258* (2011.01)
*H04N 21/4788* (2011.01)
*H04N 21/63* (2011.01)
*H04N 7/14* (2006.01)

(52) U.S. Cl.
CPC ....... *H04N 7/147* (2013.01); *H04N 21/25808* (2013.01); *H04N 21/4788* (2013.01); *H04N 21/632* (2013.01); *G06F 2203/04803* (2013.01)

(56) References Cited

U.S. PATENT DOCUMENTS

| | | | | |
|---|---|---|---|---|
| 2004/0263636 | A1* | 12/2004 | Cutler | H04N 7/15 348/211.12 |
| 2005/0010639 | A1 | 1/2005 | Long | |
| 2005/0195955 | A1 | 9/2005 | Amano et al. | |
| 2007/0168423 | A1 | 7/2007 | Park | |
| 2010/0250252 | A1 | 9/2010 | Yasoshima | |
| 2011/0016431 | A1 | 1/2011 | Grosz | |
| 2011/0154192 | A1* | 6/2011 | Yang | G06F 17/2288 715/256 |
| 2011/0161113 | A1* | 6/2011 | Rumak | G06F 19/3487 705/3 |
| 2011/0299427 | A1* | 12/2011 | Chu | H04L 12/1822 370/256 |
| 2012/0092438 | A1* | 4/2012 | Guzman Suarez | H04N 7/15 348/14.03 |
| 2012/0249734 | A1* | 10/2012 | Takayama | H04N 13/0062 348/43 |
| 2013/0002532 | A1* | 1/2013 | Raffle | G06F 3/1423 345/156 |
| 2013/0325970 | A1* | 12/2013 | Roberts | H04N 21/4788 709/206 |
| 2014/0019882 | A1* | 1/2014 | Chew | G06Q 10/10 715/753 |
| 2014/0032770 | A1* | 1/2014 | Pegg | H04L 29/06414 709/228 |

FOREIGN PATENT DOCUMENTS

| | | |
|---|---|---|
| CN | 101610544 A | 12/2009 |
| CN | 101820430 A | 9/2010 |
| CN | 101848196 A | 9/2010 |
| CN | 102006449 A | 4/2011 |
| CN | 102291562 A | 12/2011 |
| CN | 102413128 A | 4/2012 |
| RU | 2398362 C | 8/2010 |
| WO | WO/2006/011192 A | 2/2006 |
| WO | WO/2009/151940 A | 12/2009 |

OTHER PUBLICATIONS

Search Report issued in corresponding Canadian Patent Application No. 2,874,278, dated Jan. 14, 2016.
Office Action issued in corresponding Russian Patent Application No. 2014152470/08(083936), dated Jun. 3, 2016.
International Search Report issued in corresponding International Application No. PCT/CN2013/076802 dated Sep. 12, 2013.
Office Action 1 issued in corresponding Chinese Application No. 201210183638.4 dated Mar. 7, 2017, and Office Action 2 dated Jul. 19, 2017 with a Concise English Explanation.
((Design and implementation of software video conferencing system)), Zhang Ling, University of Electronic Science and Technology of China, Dec. 15, 2011.

* cited by examiner

METHOD FOR VIDEO COMMUNICATIONS AND TERMINAL, SERVER AND SYSTEM FOR VIDEO COMMUNICATIONS

CROSS-REFERENCE TO RELATED APPLICATIONS

The present application is a Continuation Application of PCT Patent Application No. PCT/CN2013/076802, filed on Jun. 5, 2013, which claims the benefit of priority of China Patent Application No. 201210183638.4 filed in the Chinese Patent Office on Jun. 6, 2012, and entitled "METHOD FOR VIDEO COMMUNICATIONS AND TERMINAL, SERVER AND SYSTEM FOR VIDEO COMMUNICATIONS", the content of which are hereby incorporated by reference in their entireties.

TECHNICAL FIELD

The present disclosure relates to the field of computers, and particularly to a method for video communications and a terminal, a server and a system for video communications.

BACKGROUND

With the development of network communications, several kinds of instant messaging (IM) applications appear on the Internet. Video communications is an application which has a huge number of users, and application mode of the video communications has been developed from one-to-one video communications application mode to one-to-many video communications application mode, and even to many-to-many video communications application mode. The users can make a video call through a variety of communication software, which provides a convenient way for such as conferences, and contacts of the users. Thus, usage scenarios of the video communications are correspondingly developing and changing, such as, from simple chats to recreation, and further to business negotiations and video conferences and the like.

In the existing technology, either the one-to-one video communications application mode, or the one-to-many video communications application mode, or even the many-to-many video communications application mode, can only realize a simple video voice communication function, but not satisfy a demand of instant messaging with more complex contents.

SUMMARY

A method for video communications, a terminal for video communications, a server for video communications, and a system for video communications are provided in the embodiments of present disclosure. Technical proposals are described as the following.

A method for video communications, including:
establishing a first communication connection between a server and a first terminal, and a second communication connection between the server and one or more second terminals, by means of a communication protocol;
receiving, by the server, local video data of the first terminal and data indicated in a first preset whiteboard zone of the first terminal, editing tools being arranged at a preset position of the first preset whiteboard zone, and the editing tools being configured to edit data indicated in the first preset whiteboard zone;
sending the local video data and the data indicated in the first preset whiteboard zone of the first terminal to the one or more second terminals; and
synchronously displaying the local video data and the data indicated in a second preset whiteboard zone on the one or more second terminals.

A server for video communications, including one or more processors; and memory having instructions stored thereon, the instructions, when executed by the one or more processors, caused the processors to perform operations including:
establishing a first communication connection between the server and a first terminal, and a second communication connection between the server and one or more second terminals, by means of a communication protocol;
receiving local video data of the first terminal and data indicated in a first preset whiteboard zone of the first terminal; and
sending the local video data and the data in the first preset whiteboard zone of the first terminal to the one or more than one second terminals, to allow the one or more second terminals to display the local video data and the data indicated in the first preset whiteboard zone.

A system for video communications, including a first terminal for video communication and a server for video communication, wherein the first terminal for video communication includes:
a communication establishing module of the first terminal configured to establish a communication connection with the server by means of a communication protocol; and
a first sending module of the first terminal configured to send local video data and data indicated in a first preset whiteboard zone to the server, to allow the server to send the local video data and the data indicated in first the preset whiteboard to one or more second terminals;
the server for video communication includes:
a communication establishing module of the server configured to establish a first communication connection between the server and the first terminal, and a second communication connection between the server and the one or more second terminals, by means of a communication protocol;
a first receiving module configured to receive the local video data of the first terminal and data indicated in the first preset whiteboard zone of the first terminal; and
a first sending module of the server configured to send the local video data and the data in the first preset whiteboard zone of the first terminal to the one or more second terminals, to allow the one or more second terminals to display the local video data and the data indicated in the first preset whiteboard zone.

A beneficial effect of the embodiments of present disclosure is described as the following.

By establishing a first communication connection between a sever and a first terminal, and a second communication between the server and one or more second terminal, by means of a communication protocol, receiving, by the server, local video data of the first terminal and data indicated in a first preset whiteboard zone in the process of video communications and sending the local video data and the data indicated in the first whiteboard zone of the first terminal to the one or more than one second terminals through the server, the embodiment of present disclosure, can make complex contents to be shown in a one-to-one, a one-to-many or even a many-to-many video communications applications so as to satisfy the demand and experience of video communications in the scene of chats, recreation, business negotiations, video conferences and the like.

BRIEF DESCRIPTION OF THE DRAWINGS

In order to make embodiments of present disclosure more clearly, the drawings which are needed in the embodiments of present disclosure are described simply as follows. It is obviously, the drawings described as the follows are only exemplary embodiments of present disclosure. To a person of ordinary skill in the art, under premise of no creative work, other drawings may be obtained according to the drawings.

DETAILED DESCRIPTION OF ILLUSTRATED EMBODIMENTS

Further descriptions of present disclosure will be illustrated clearly and completely, which is combined with embodiments in drawings and detailed embodiments.

An Embodiment

Figure 1:
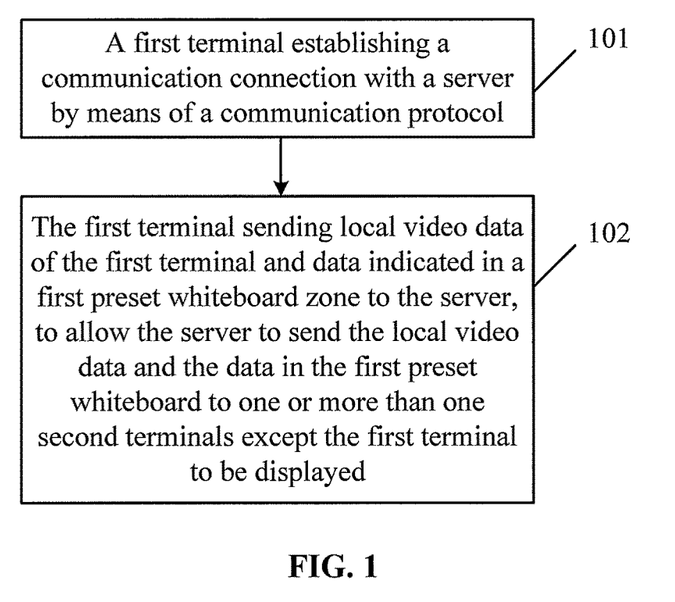
FIG. 1 is a first flowchart of a method for video communications provided in an embodiment of present disclosure.

Referring to FIG. 1, FIG. 1 is a first flowchart of a method for video communications provided in an embodiment of present disclosure. The method for video communications is implemented by a terminal. The method for video communications includes the following steps.

Step 101, a first terminal establishing a communication connection with a server by means of a communication protocol.

Step 102, the first terminal sending local video data of the first terminal and data indicated in a first preset whiteboard zone to the server, to allow the server to send the local video data and the data in the first preset whiteboard to one or more than one second terminals except the first terminal to be displayed.

Figure 2:
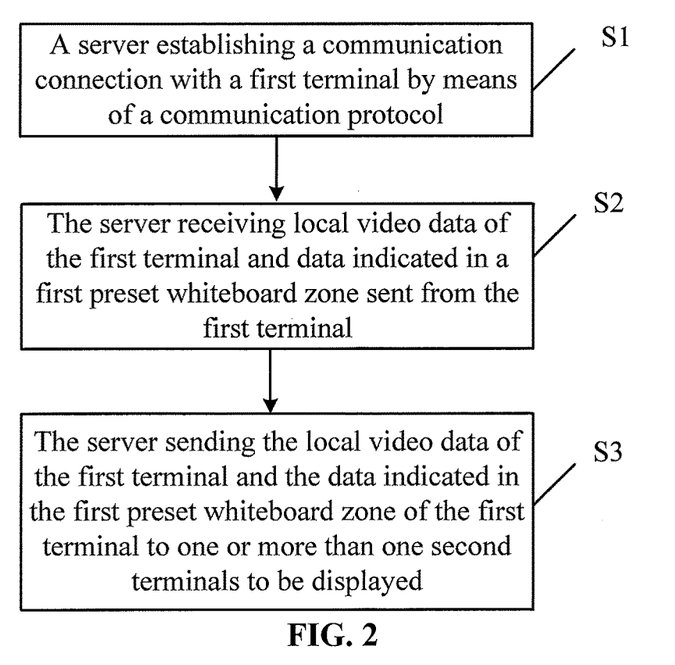
FIG. 2 is a second flowchart of a method for video communication provided in an embodiment of present disclosure.

Referring to FIG. 2, FIG. 2 is a second flowchart of a method for video communication provided in an embodiment of present disclosure. The method for video communications is implemented by a server. The method for video communications includes the following steps.

Step S1, a server establishing a communication connection with a first terminal by means of a communication protocol.

Step S2, the server receiving local video data of the first terminal and data indicated in a first preset whiteboard zone sent from the first terminal.

Step S3, the server sending the local video data of the first terminal and the data indicated in the first preset whiteboard zone of the first terminal to one or more than one second terminals to be displayed.

In the method for video communication provided in the embodiment of present disclosure, by providing a first preset whiteboard zone in the process of video communications and sending the data indicated in the first preset whiteboard zone to the one or more than one second terminals through a server, the embodiment of present disclosure, can make complex contents to be shown in a one-to-one, a one-to-many or even a many-to-many video communications application so as to satisfy the demand and experience of video communications in the scene of chats, recreation, business negotiations, video conferences and the like.

Another Embodiment

A method for video communications provided in the embodiment of present disclosure, which can realize the video communications, and can further show complex contents required during the video communications at the same time. Such as, documents, images, drawings, and text input, etc.

Figure 3:
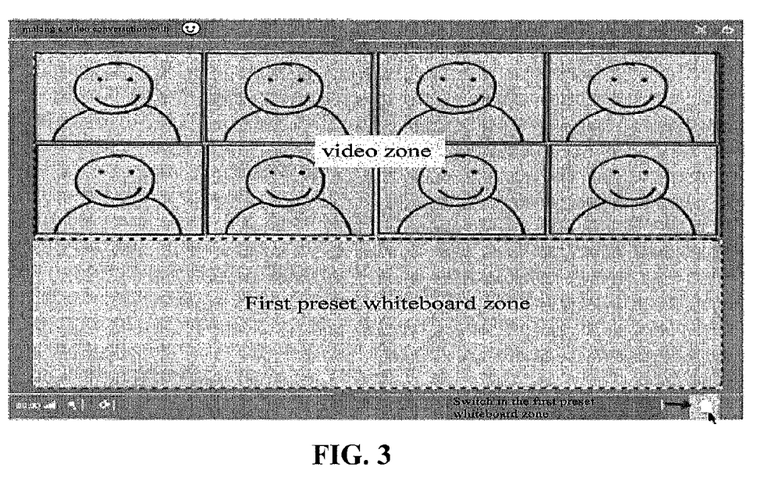
FIG. 3 is a schematic diagram of a preset whiteboard zone provided in another embodiment of present disclosure.

It should be noted that the method provided in the embodiment needs to preset a first preset whiteboard zone in the video communications application of the first terminal. The first preset whiteboard zone is a data displaying zone during the video communications, and can be configured to display the complex contents in the process of video communications. Preferably, the first preset whiteboard zone is located below a video zone, and the first preset whiteboard zone can be activated by operating switch button in the first preset whiteboard zone by a user. As shown in FIG. 3, FIG. 3 is a schematic diagram of a first preset whiteboard zone provided in another embodiment of present disclosure. The first preset white zone can be used in the one-to-one or the one-to-many video communications. The local video data of the first terminal and the data indicated in the first preset whiteboard zone are displayed in the video zone and the first preset whiteboard zone respectively. Understandably, in other embodiments, the first preset whiteboard zone can be located in other positions, such as, above the video zone, on the left of the video zone, or on the right of the video zone, and this embodiment is not limited to any detailed position.

Figure 4:
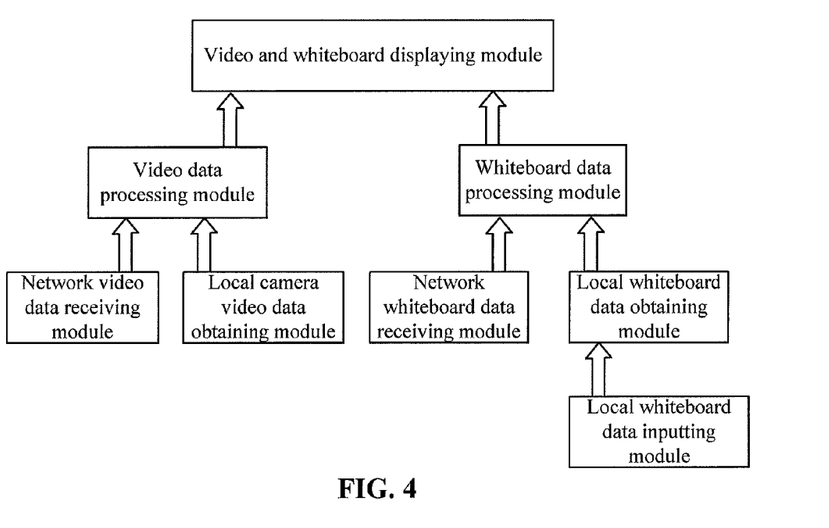
FIG. 4 is a schematic diagram of functional modules of an improved terminal used for video communications provided in another embodiment of present disclosure.

FIG. 4 is provided here in the embodiment in order to conveniently make an illustration. FIG. 4 is a schematic diagram of functional modules of an improved first terminal used for video communications provided in another embodiment of present disclosure.

As shown in FIG. 4, a network video data receiving module is configured to receive video data of one or more than one second terminals sent by a server. A local camera video data obtaining module is configured to obtain video data of a local user of the first terminal. A local whiteboard data obtaining module is configured to receive whiteboard zone data edited by the local user by means of a local whiteboard data input module. A network whiteboard data receiving module is configured to receive whiteboard zone data of other users sent by the server. A video data processing module is configured to set a display location of the video data in the video zone. A whiteboard data processing module is configured to set a display location of the whiteboard zone data in the whiteboard zone. The video data and the whiteboard zone data are outputted on corresponding display location by a video and whiteboard displaying module.

Furthermore, in order to ensure that all one or more than one second terminals which take part in the video communications display the same content, the video zone can display the video screens of each participant terminal at a specified display location preset by the video data processing module, and the whiteboard zone can display the contents of the whiteboard zone of each participant terminal at a specified display location preset by the whiteboard data processing module. Location information of displaying the video screens and location information of displaying the contents of the whiteboard zone can be common location information issued by the server, and the common location information can be obtained by the network video data receiving module and the network whiteboard data receiving module.

Figure 5:
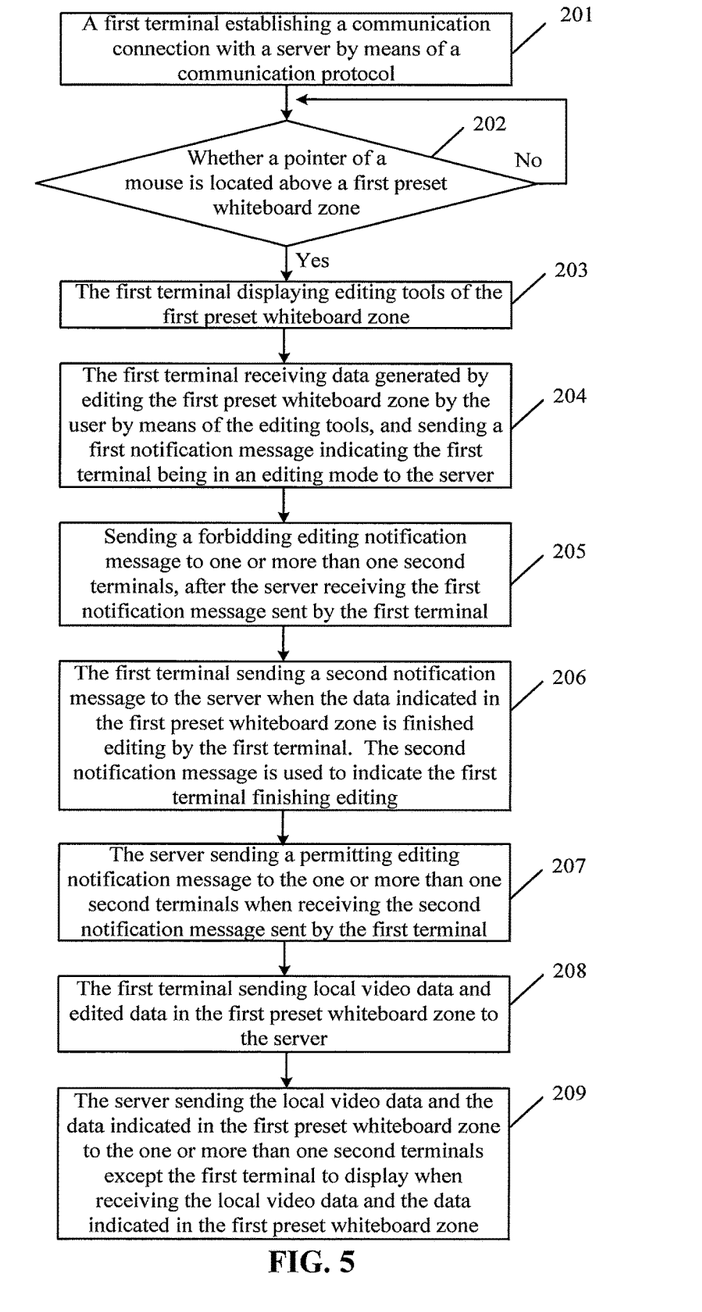
FIG. 5 is a flowchart of a method for video communications provided in another embodiment of present disclosure.

Referring to FIG. 5, FIG. 5 is a flowchart of a method for video communications provided in another embodiment of present disclosure. The method for video communications includes the following steps.

Step 201, a first terminal establishing a communication connection with a server by means of a communication protocol.

It should be noted that the video communications is initiated by the first terminal, and one or more than one users are invited to participate in the video communications. When the user receives an invitation of the video communications, then the first terminal establishes the communication connection with the server by means of the communication protocol.

The communication protocol can be a transmission control protocol/Internet protocol (TCP/IP).

Step 202, the first terminal determining whether a mouse pointer is located above a first preset whiteboard zone of the first terminal or not. If the mouse pointer is located above the first preset whiteboard zone, a step 203 is implemented; otherwise, the step 202 is implemented repeatedly.

Further, before the step 202, the method for video communications also includes the following step.

Displaying the first preset whiteboard zone when an instruction of opening the first preset whiteboard zone from a user is detected.

The operation of opening the first preset whiteboard zone by a user can be implemented by a preset switch in the first preset whiteboard zone.

Further, the step of the first terminal determining whether a mouse pointer is located above a first preset whiteboard zone or not, includes the following step.

Determining whether or not a mouseover event of the mouse happens for an element in the first preset whiteboard zone.

It should be noted that the mouseover event is triggered when the pointer is located above the element, then a function corresponding to the mouseover event is implemented.

Step 203, the first terminal displaying editing tools of the first preset whiteboard zone.

Figure 6:
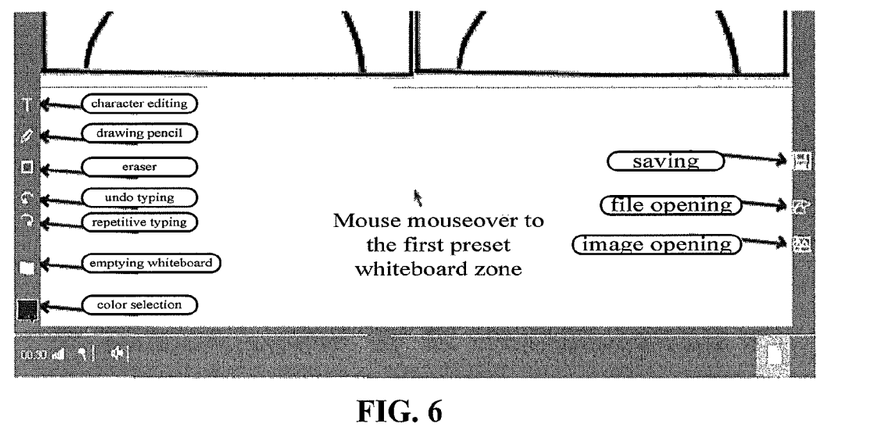
FIG. 6 is a schematic diagram of the whiteboard zone having editing tools provided in another embodiment of present disclosure.

As shown in FIG. 6, the editing tools are arranged at a preset position of the first preset whiteboard zone (such as, both sides of the first preset whiteboard zone). The editing tools are hidden before the mouseover event is triggered; when the mouseover event is triggered, then the editing tools are displayed.

Figure 7:
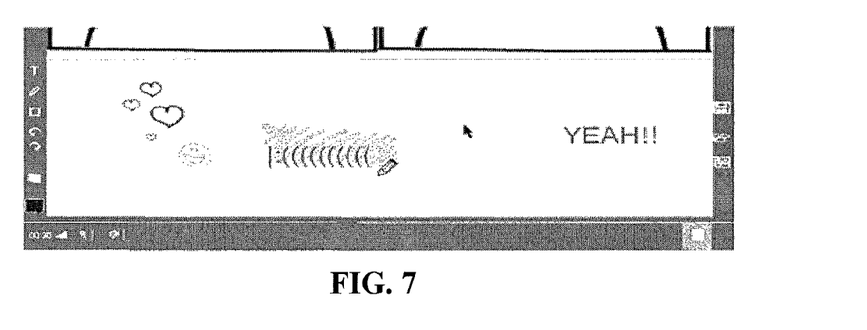
FIG. 7 is an exhibition effect picture of drawing in the whiteboard zone provided in another embodiment of present disclosure.
Figure 8A:
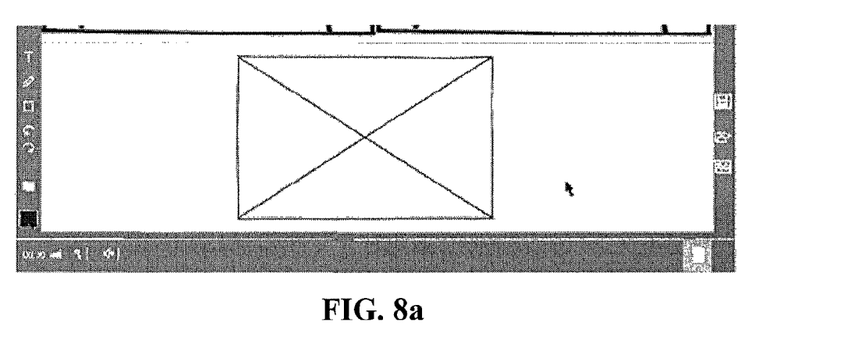
FIG. 8a is an exhibition effect picture of opening image in the whiteboard zone using the editing tools provided in another embodiment of present disclosure.
Figure 8B:
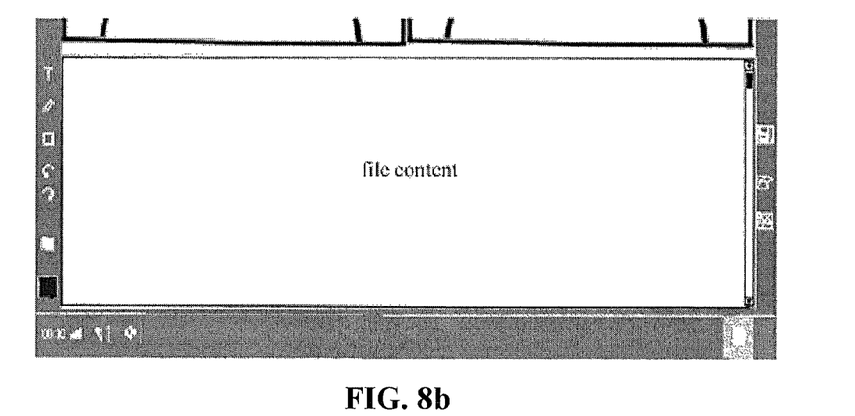
FIG. 8b is an exhibition effect picture of opening file in the whiteboard zone using the editing tools provided in another embodiment of present disclosure.

The editing tools mentioned above can include but not limit to one or several kinds of the following tools: such as, a character editing tool, a drawing pencil tool, an eraser tool, an undo typing tool, a repetitive typing tool, an empty whiteboard tool, a color selection tool, a save tool, an open-file tool, an open-image tool. The user can perform the following actions in the first preset whiteboard zone by using the editing tools: character input, drawing, displaying documents and pictures, and personalized graffiti, and showing the data to be displayed of every participant, etc. Referring to FIG. 7, FIG. 7 is an exhibition effect picture of drawing in the whiteboard zone provided in another embodiment of present disclosure. Referring to FIG. 8a, FIG. 8a is an exhibition effect picture of opening image in the first preset whiteboard zone using the editing tools provided in another embodiment of present disclosure. Referring to FIG. 8b, FIG. 8b an exhibition effect picture of opening file in the first preset whiteboard zone using the editing tools provided in another embodiment of present disclosure.

Further, when a display area occupied by the data in the first preset whiteboard zone is not sufficient, that is, when a display area cannot display all the data in the first preset whiteboard zone once, the first preset whiteboard zone can be extended. For example, by dragging a scroll bar on the right side of the first preset whiteboard zone, all the data in the first preset whiteboard zone can be displayed.

Step 204, the first terminal receiving data generated by editing the first preset whiteboard zone by the user by means of the editing tools, and sending a first notification message indicating the first terminal being in an editing mode to the server.

Step 205, sending a forbidding editing notification message to one or more than one second terminals, after the server receiving the first notification message sent by the first terminal.

The forbidding editing notification message is used to indicate the one or more than one second terminals to forbid editing the data indicated in the first preset whiteboard zone.

It should be noted that, in order to avoid confusedly editing the data indicated in the first preset whiteboard zone, only a user is allowed to edit the data indicated in the first preset whiteboard zone at the same time. Thus, when a user is editing the data indicated in the first preset whiteboard zone of the first terminal, the first terminal is set to be in the editing mode, and one or more than one second terminals cannot edit the data indicated in the first preset whiteboard until the editing mode of the first terminal is deactivated. On the other side, the mouse pointers of the one or more than one second terminals can be set to be in a deactivated mode, in this deactivated mode the users of the one or more than one second terminals cannot edit the data indicated in the first preset whiteboard zone, and the editing tools of the first preset whiteboard zone is locked for the users of the one or more than one second terminals.

Step 206, the first terminal sending a second notification message to the server when the data indicated in the first preset whiteboard zone is finished editing by the first terminal. The second notification message is used to indicate the first terminal finishing editing.

Step 207, the server sending a permitting editing notification message to the one or more than one second terminals when receiving the second notification message sent by the first terminal.

The permitting editing notification message is configured to indicate the one or more than one second terminals that the data indicated in the first preset whiteboard zone are allowed to be edited. After the user of the first terminal finishes editing the data indicated in the first preset whiteboard zone, the server then sends the permitting editing notification message to the one or more than one second terminals, to make the one or more than one second terminals to get rid of the deactivated mode, so that the one or more than one second terminals can edit the data indicated in the first preset whiteboard zone.

Step 208, the first terminal sending local video data and edited data in the first preset whiteboard zone to the server.

The local video data can be obtained by the local camera video data obtaining module, which has the same obtaining manner as that of the existing technology, thus, repeated illustrations are no longer provided and described here.

Further, the step of the first terminal sending local video data and data edited in the first preset whiteboard zone to the server, can include the following step.

Making a screenshot to the display area in the first preset whiteboard zone to obtain a whiteboard zone screenshot, and sending the local video data and the whiteboard zone screenshot to the server.

Step 209, the server sending the local video data and the data indicated in the first preset whiteboard zone to the one or more than one second terminals except the first terminal to display when receiving the local video data and the data indicated in the first preset whiteboard zone.

The steps 202-209 of the embodiment describe a method for displaying the data indicated in the first preset whiteboard zone by the one or more than one second terminals. By implementing the steps 202-209, different terminal of the one or more than one second terminals are allowed to edit the data indicated in the first preset whiteboard zone, and can send the data indicated in the first preset whiteboard zone to the server. The server sends the edited data in the first preset whiteboard zone to each terminal of the one or more than one second terminals. By repeatedly implementing the steps 202-209, the data indicated in the first preset whiteboard zone can be displayed on all the second terminals.

In the method for video communication provided in the embodiment of present disclosure, by providing a first preset whiteboard zone in the process of video communications and sending the data indicated in the first whiteboard zone among the one or more than one second terminals through a server, the embodiment of present disclosure, can make complex contents to be shown in a one-to-one, a one-to-many or even many-to-many video communications application so as to satisfy the demand and experience of video communications in the scene of chats, recreation, business negotiations, video conferences and the like.

Yet Another Embodiment

Figure 9:
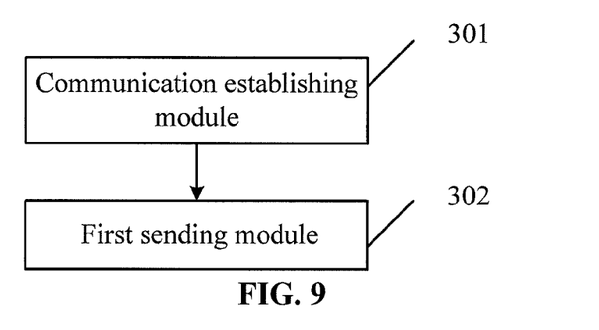
FIG. 9 is a first schematic diagram of a terminal for video communications provided in yet another embodiment of present disclosure.

Referring to FIG. 9, FIG. 9 is a first schematic diagram of a terminal for video communications provided in yet another embodiment of present disclosure. The first terminal for video communications includes the following modules.

A communication establishing module 301 of the first terminal is configured to establish a communication connection with a server by means of a communication protocol.

A first sending module 302 of the first terminal is configured to send local video data and data indicated in a first preset whiteboard zone to the server, to allow the server to send the local video data and the data indicated in the first preset whiteboard to one or more than one second terminals except the first terminal to be displayed.

Figure 10:
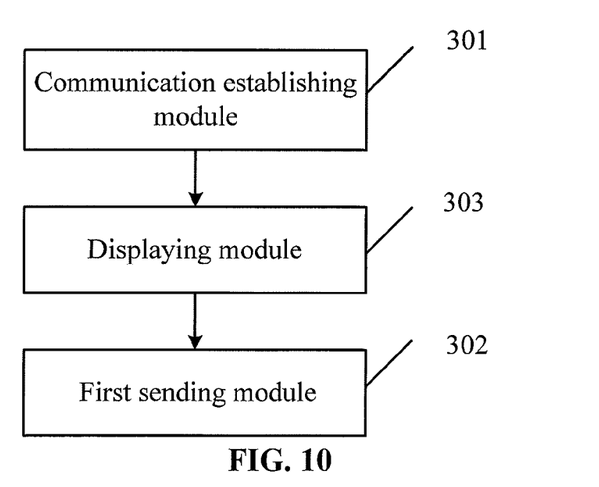
FIG. 10 is a second schematic diagram of a terminal for video communications provided in yet another embodiment of present disclosure.

Combined with the first terminal mentioned above, in an embodiment, further the first preset whiteboard zone is a data displaying zone during the video communications, and editing tools are arranged at a preset position of the first preset whiteboard zone. The editing tools are configured to edit the date in the first preset whiteboard zone. As shown in FIG. 10, the first terminal for video communications further includes the following module.

A displaying module 303 of the first terminal is configured to display editing tools when a mouse pointer is detected to be located above the first preset whiteboard zone, before the first sending module 302 sends the local video data and the data indicated in the first preset whiteboard zone to the server.

Figure 11:
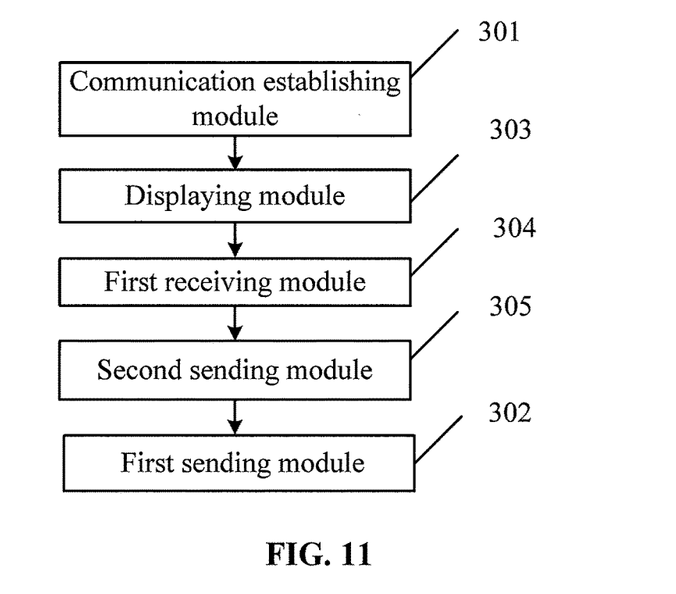
FIG. 11 is a third schematic diagram of a terminal for video communications provided in yet another embodiment of present disclosure.

Combined with an embodiment, as shown in FIG. 11, the first terminal mentioned above further includes the following modules in another embodiment.

A first receiving module 304 of the first terminal is configured to receive data generated by editing the first preset whiteboard zone by the user by means of the editing tools, when the displaying module 303 displays the editing tools.

A second sending module 305 of the first terminal is configured to send a first notification message indicating the first terminal being in an editing mode to the server, to allow the server to send a forbidding editing notification message to the one or more than one second terminals, the forbidding editing notification message is used to indicate the one or more than one second terminals to forbid editing the data indicated in the first preset whiteboard zone.

Figure 12:
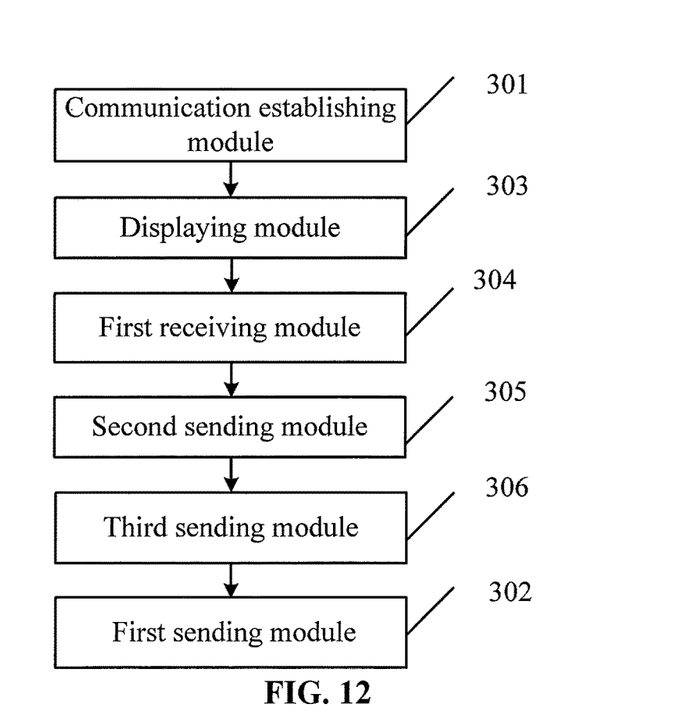
FIG. 12 is a fourth schematic diagram of a terminal for video communications provided in a yet another embodiment of present disclosure.

Combined with another embodiment, as shown in FIG. 12, the first terminal mentioned above further includes the following modules in yet another embodiment.

A third sending module 306 of the first terminal is configured to send a second notification message which indicates the first terminal finishing editing to the server, when the user finishes editing, after the second sending module 305 sends the first notification message indicating the first terminal is in an editing mode to the server, to allow the server to send a permitting editing notification message to one or more than one second terminals, the permitting editing notification message is configured to indicate the one or more than one second terminals that the data indicated in the first preset whiteboard zone is allowed to be edited.

Figure 13:
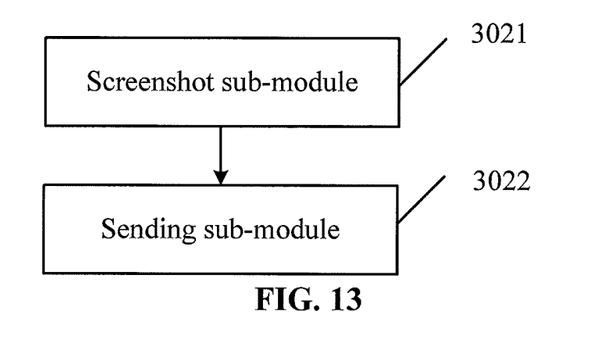
FIG. 13 is a schematic diagram of a first sending module of the terminal for video communications provided in yet another embodiment of present disclosure.

Combined with an embodiment, as shown in FIG. 13, the first sending module 302 of the first terminal includes the following modules in yet another embodiment.

A screenshot sub-module 3021 is configured to make a screenshot to the display area in the first preset whiteboard zone to obtain a whiteboard zone screenshot.

A sending sub-module 3022 is configured to send the local video data and the whiteboard zone screenshot to the server.

The terminal provided in the embodiment can implement the method provided in any embodiment of method. The detail process of the terminal can refer to the description of the embodiment of method, and it is not repeated here.

In the terminal for video communication provided in the embodiment of present disclosure, by providing a preset whiteboard zone in the process of video communications and sending the data in the whiteboard zone among the one or more than one second terminals through a server, the embodiment of present disclosure, can make complex contents to be shown in a one-to-one, a one-to-many or even a many-to-many video communications application so as to satisfy the demand and experience of video communications in the scene of chats, recreation, business negotiations, video conferences and the like.

Yet Another Embodiment

Figure 14:
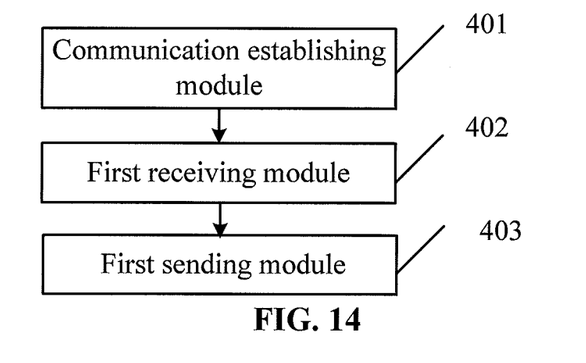
FIG. 14 is a first schematic diagram of a server for video communications provided in a yet another embodiment of present disclosure.

Referring to FIG. 14, FIG. 14 is a first schematic diagram of server for video communications provided in yet another embodiment of present disclosure. As shown in FIG. 14 the server for video communications includes the following modules.

A communication establishing module 401 of the server is configured to establish a first communication connection between the server and the first terminal, and a second communication connection between the server and one or more second terminals, by means of a communication protocol.

A first receiving module 402 of the server is configured to receive local video data and data indicated in a first preset whiteboard zone sent by the first terminal.

A first sending module 403 of the server is configured to send the local video data and the data indicated in the first preset whiteboard zone of the first terminal to the one or more than one second terminals except the first terminal, to allow the one or more than one second terminals to display the local video data and the data indicated in the first preset whiteboard zone.

Figure 15:
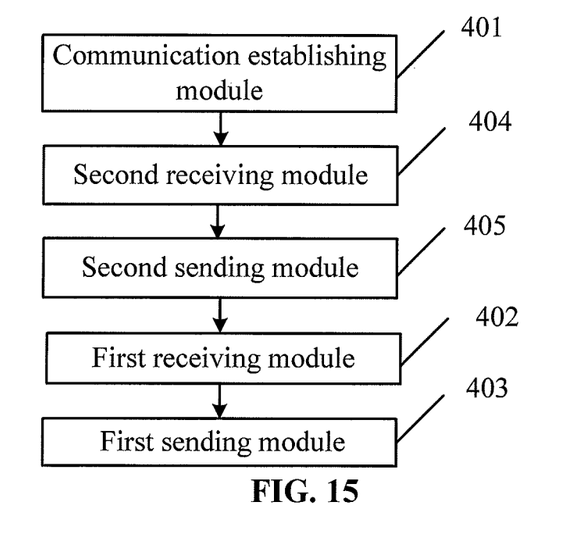
FIG. 15 is a second schematic diagram of a server for video communications provided in yet another embodiment of present disclosure.

Combined with the sever above-mentioned, as shown in FIG. 15, the server further includes the following modules in an embodiment.

A second receiving module 404 is configured to receive a first notification message indicating the first terminal being in an editing mode sent by the first terminal, before the first receiving module 402 receives the local video data and the data indicated in a first preset whiteboard zone sent by the first terminal.

A second sending module 405 is configured to send a forbidding editing notification message to the one or more than one second terminals, and the forbidding editing notification message is used to indicate the one or more than one second terminals to forbid editing the data indicated in the first preset whiteboard zone.

Figure 16:
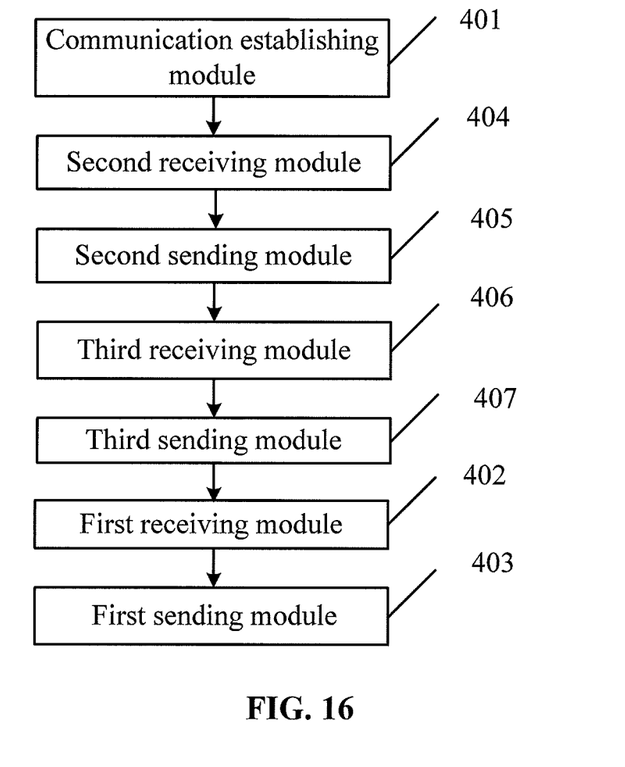
FIG. 16 is a third schematic diagram of a server for video communications provided in yet another embodiment of present disclosure.

Combined with an embodiment, as shown in FIG. 16, the server mentioned above further includes the following modules in another embodiment.

A third receiving module 406 is configured to receive a second notification message which indicates the first terminal finishing editing sent by the first terminal, when the data indicated in the first preset whiteboard zone is finished editing by the user, after the second sending module 405 sends the forbidding editing notification message to the one or more than one second terminals.

A third sending module 407 is configured to send a permitting editing notification message to the other one or more than one second terminals, the permitting editing notification message is used to indicate the other one or more than one second terminals that the data in the first preset whiteboard zone are allowed to be edited.

The server provided in the embodiment can implement the method provided in any embodiment of method. The detail process of the first terminal can refer to the description of the embodiment of method, and it is not repeated here.

In the server for video communication provided in the embodiment of present disclosure, by receiving the video data and the data in the whiteboard zone, and sending the video data and the data in the whiteboard zone to the other one or more than one second terminals, can make complex contents to be shown in a one-to-one, a one-to-many or even a many-to-many video communications application so as to satisfy the demand and experience of video communications in the scene of chats, recreation, business negotiations, video conferences and the like.

Yet Another Embodiment

Figure 17:
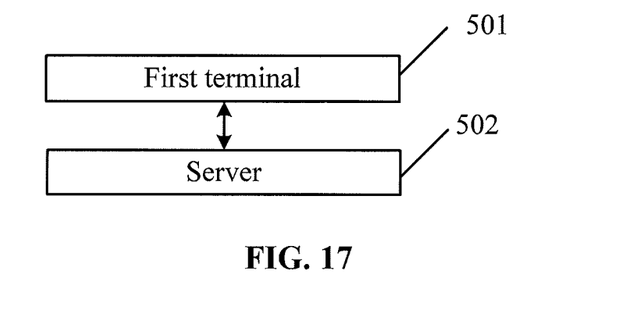
FIG. 17 is a schematic diagram of a system for video communications provided in a yet another embodiment of present disclosure.

Referring to FIG. 17, FIG. 17 is a schematic diagram of a system for video communications provided in yet another embodiment of present disclosure. The system for video communications provided in the embodiment includes the first terminal for video communication 501 in yet another embodiment, and the server for video communication 502 in yet another embodiment.

The function of the first terminal for video communication 501 has the same function as the first terminal for video communication in yet another embodiment described above, and the function of the server for video communication 502 has the same function as the server for video communication in yet another embodiment described above. Thus, the functions of the first terminal for video communication 501 and the server for video communication 502 are not repeated here.

The system for video communications provided in the embodiment can implement any method provided in the method embodiments, and a detailed process can refer to the descriptions in the above method embodiments, therefore which is not repeated here.

The system for video communications provided in the embodiment of present disclosure, by providing a first preset whiteboard zone in the process of video communications and sending the data indicated in the first preset whiteboard zone among the second terminals through a server, the embodiment of present disclosure, can make complex contents to be shown in a one-to-one, a one-to-many or even a many-to-many video communications application so as to satisfy the demand and experience of video communications in the scene of chats, recreation, business negotiations, video conferences and the like.

It should be noted that when the first terminal for video communications performs video communications with the server for video communications provided in the above embodiments, a division of each functional module is only taken here as an example. In the actual application, different functional modules can be distributed according to the function described above as required. In other words, the internal structures of the first terminal and the server can be divided into different functional modules to implement all or parts of the functions described above. In addition, the first terminal, the server, and the method for video communications belong to the same conception, and the detail processes can refer to the method embodiments described above, which are not repeated here.

A serial number of each embodiment of present disclosure is only for describing the embodiments conveniently, and the serial number of each embodiment does not represent good or bad.

A person having ordinary skills in the art can realize that part or whole of the processes in the methods according to the above embodiments may be implemented by a computer program instructing relevant hardware. The program may be stored in a computer readable storage medium. When executed, the program may execute processes in the above-mentioned embodiments of methods. The storage medium may be a magnetic disk, an optical disk, a Read-Only Memory (ROM), a Random Access Memory (RAM), et al.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A method for video communications, comprising:
    establishing a first communication connection between a server and a first terminal, and a second communication connection between the server and one or more second terminals, by means of a communication protocol;
    displaying editing tools on an extendable preset whiteboard zone, upon detecting that a mouse pointer is located at the preset whiteboard zone, wherein the preset whiteboard zone is a data displaying zone for displaying data transmitted during the communication, and wherein the editing tools are arranged at a preset position of the preset whiteboard zone and are configured to edit the data displayed in the preset whiteboard zone;
    receiving, by the server, local video data and other data from the first terminal, wherein the local video data is displayed in a video zone of the first terminal and the other data is displayed in the preset whiteboard zone of the first terminal, wherein the other data is configured to be a whiteboard zone screenshot comprising the data displayed in the preset whiteboard zone of the first terminal;
    receiving, by the server, a first notification message sent by the first terminal indicating the first terminal being in an editing mode;
    sending, by the server, a forbidding editing notification message to the one or more second terminals, the forbidding editing notification message being configured to indicate the one or more second terminals to forbid editing the data in the preset whiteboard zone by disabling a mouse pointer;
    receiving, by the server, a second notification message sent by the first terminal, when the data in the preset whiteboard zone being finished editing by the user, the second notification message being configured to indicate the first terminal finishing editing;
    sending, by the server, a permitting editing notification message to the one or more second terminals, the permitting editing notification message being configured to indicate the one or more second terminals that the data in the preset whiteboard zone are allowed to be edited;
    transmitting the local video data and the other data from the first terminal to the one or more second terminals; and
    synchronously displaying the transmitted local video data and other data in the video zone and in the preset whiteboard zone respectively on the one or more second terminals based on location information issued by the server.

2. The method for video communication according to claim 1, wherein the step of receiving, by the server, the local video data and the data from the first terminal comprises:
    making a screenshot of the preset whiteboard zone to obtain a whiteboard zone screenshot, the whiteboard zone screenshot comprising the data displayed in the preset whiteboard zone of the first terminal; and
    sending the local video data of the first terminal and the whiteboard zone.

3. A server for video communications, comprising:
    one or more processors; and
    a memory having instructions stored therein, the instructions, when executed by the one or more processors, cause the processors to perform operations comprising:
    establishing a first communication connection between the server and a first terminal, and a second communication connection between the server and one or more second terminals, by means of a communication protocol;
    displaying editing tools on an extendable preset whiteboard zone, upon detecting that a mouse pointer is located at the preset whiteboard zone, wherein the preset whiteboard zone is a data displaying zone for displaying data transmitted during the communication, and wherein the editing tools are arranged at a preset position of the preset whiteboard zone and are configured to edit the data displayed in the preset whiteboard zone;
    receiving a first notification message sent by the first terminal indicating the first terminal being in an editing mode;
    sending a forbidding editing notification message to the one or more second terminals, the forbidding editing notification message being configured to indicate the one or more second terminals to forbid editing the data in the preset whiteboard zone by disabling a mouse pointer;
    receiving a second notification message which indicates the first terminal finishing editing sent by the first terminal, when the data in the preset whiteboard zone is finished editing by the user, after the forbidding editing notification message is sent to the one or more second terminals;
    sending a permitting editing notification message to the one or more second terminals, the permitting editing notification message being configured to indicate the one or more second terminals that the data in the preset whiteboard zone are allowed to be edited;
    receiving local video data and other data from the first terminal, wherein the local video data is displayed in a video zone of the first terminal and the other data is displayed in the preset whiteboard zone of the first terminal; wherein the other data is configured to be a whiteboard zone screenshot comprising the data displayed in the preset whiteboard zone of the first terminal; and
    transmitting the local video data and the other data from the first terminal to the one or more second terminals, to allow the one or more second terminals to synchronously display the transmitted local video data and other data displayed in the video zone and the preset whiteboard zone thereof respectively based on location information issued by the server.

\* \* \* \* \*